US010294363B2

(12) United States Patent
Guzman

(10) Patent No.: US 10,294,363 B2
(45) Date of Patent: May 21, 2019

(54) COATING SYSTEM

(71) Applicant: HP Indigo B.V., Amstelveen (NL)

(72) Inventor: Minedys Macias Guzman, San Diego, CA (US)

(73) Assignee: HP Indigo B.V., Amstelveen (NL)

( * ) Notice: Subject to any disclaimer, the term of this patent is extended or adjusted under 35 U.S.C. 154(b) by 3 days.

(21) Appl. No.: 15/547,461

(22) PCT Filed: Apr. 28, 2015

(86) PCT No.: PCT/US2015/027954
§ 371 (c)(1),
(2) Date: Jul. 28, 2017

(87) PCT Pub. No.: WO2016/175760
PCT Pub. Date: Nov. 3, 2016

(65) Prior Publication Data
US 2018/0037733 A1  Feb. 8, 2018

(51) Int. Cl.
C08L 67/00 (2006.01)
G03G 9/12 (2006.01)
(Continued)

(52) U.S. Cl.
CPC .......... C08L 67/00 (2013.01); C08G 18/0852 (2013.01); C08G 18/4009 (2013.01);
(Continued)

(58) Field of Classification Search
CPC ............ C08G 18/0852; C08G 18/4009; C08G 18/42; C08G 18/48; C08G 18/61;
(Continued)

(56) References Cited

U.S. PATENT DOCUMENTS 3,931,387 A  1/1976 Hostettler
4,130,708 A  12/1978 Friedlander et al.
(Continued)

FOREIGN PATENT DOCUMENTS

EP  0192627  8/1986
EP  1526150  4/2005
(Continued)

OTHER PUBLICATIONS

"Desmodure® N 3200 Aliphatic Polyisocyanate", Product Information, Bayer MaterialScience, 2010, 3 pgs, www.bayermaterialsciencenafta.com.
(Continued)

Primary Examiner — Thao T Tran
(74) Attorney, Agent, or Firm — HP Inc. Patent Department

(57) ABSTRACT

Described herein is a two-component coating system. The two-component coating system may include a base component and a hardener component. The base component may include: up to 55 wt. % hydroxyl terminated polyester and/or hydroxyl terminated polyether; up to 3 wt. % hydroxyl terminated polysiloxane; and a solvent selected from aromatic hydrocarbons, ketones, esters and combinations thereof, wherein the hydroxyl terminated polyester and/or hydroxyl terminated polyether and the hydroxyl terminated polysiloxane are dissolved in the solvent. The hardener component may include: up to 80 wt. % polyisocyanate; and a solvent selected from aromatic hydrocarbons, ketones, esters and combinations thereof, wherein the polyisocyanate is dissolved in the solvent.

19 Claims, 3 Drawing Sheets

(51) Int. Cl.
| | |
|---|---|
| C09D 175/04 | (2006.01) |
| C08G 18/61 | (2006.01) |
| C08G 18/08 | (2006.01) |
| C08G 18/40 | (2006.01) |
| C08G 18/42 | (2006.01) |
| C08G 18/48 | (2006.01) |
| G03G 15/02 | (2006.01) |
| G03G 15/10 | (2006.01) |
| C09D 167/00 | (2006.01) |
| C08G 77/16 | (2006.01) |
| C09D 11/02 | (2014.01) |

(52) U.S. Cl.
CPC ............. *C08G 18/42* (2013.01); *C08G 18/48* (2013.01); *C08G 18/61* (2013.01); *C09D 175/04* (2013.01); *G03G 9/12* (2013.01); *G03G 15/0233* (2013.01); *C08G 77/16* (2013.01); *C09D 11/02* (2013.01); *C09D 167/00* (2013.01); *G03G 15/10* (2013.01)

(58) Field of Classification Search
CPC ....... C08L 77/16; C09D 11/02; C09D 167/00; C09D 175/04; G03G 15/0233; G03G 15/10; G03G 9/12
USPC .................... 428/423.1; 528/65; 427/385.5
See application file for complete search history.

(56) References Cited

U.S. PATENT DOCUMENTS

| | | | | |
|---|---|---|---|---|
| 5,910,369 | A | * | 6/1999 | Macris ..................... B05D 5/00 428/423.1 |
| 6,905,772 | B2 | | 6/2005 | Shoup et al. |
| 7,531,278 | B2 | | 5/2009 | Sugino et al. |
| 8,428,495 | B2 | | 4/2013 | Li |
| 2002/0128138 | A1 | * | 9/2002 | Hirayama .......... G03G 15/0818 492/56 |
| 2006/0047064 | A1 | * | 3/2006 | Murata ................ C03C 17/322 524/589 |
| 2007/0054134 | A1 | | 3/2007 | Niesten et al. |
| 2010/0209143 | A1 | | 8/2010 | Nakai et al. |
| 2012/0282834 | A1 | | 11/2012 | Palm et al. |
| 2012/0301818 | A1 | | 11/2012 | Gilmartin et al. |
| 2014/0186621 | A1 | | 7/2014 | Popa et al. |
| 2014/0295089 | A1 | | 10/2014 | Li et al. |

FOREIGN PATENT DOCUMENTS

| | | |
|---|---|---|
| JP | S60-250069 | 12/1985 |
| JP | S61-260419 | 11/1986 |
| JP | H02-165412 | 6/1990 |
| JP | H03152713 | 6/1991 |
| JP | H05-506268 | 9/1993 |
| JP | H05-345871 | 12/1993 |
| JP | H08-269156 | 10/1996 |
| JP | H09-003387 | 1/1997 |
| JP | H10-030014 | 2/1998 |
| JP | H11-512948 | 11/1999 |
| JP | H11-343458 | 12/1999 |
| JP | 2003-025512 | 1/2003 |
| JP | 2003-192988 | 7/2003 |
| JP | 2005-046686 | 2/2005 |
| JP | 2005-534464 | 11/2005 |
| JP | 2008525181 | 7/2008 |
| JP | 2008222773 | 9/2008 |
| JP | 2011-528612 | 11/2011 |
| JP | 2014-129524 | 7/2014 |

OTHER PUBLICATIONS

"Desmophen® 651 MPA Hydroxyl-Bearing Polyester", Product Information, Bayer MaterialScience, 2013, 3 pgs, www.bayermaterialsciencenafta.com.
"Desmophen® 670 BA", Bayer Desmophen Product Datasheet, Bayer MaterialScience, 2013, 5 pages, www.materialscience.bayer.com.
"Desmophen® 670 BA Hydroxyl-bearing polyester", Product Information, Bayer MaterialScience, 2013, 2 pgs, www.bayermaterialsciencenafta.com.
"Dow Corning® 5562 Carbinol Fluid", Product Information Personal Care Dow Corning, 2009, 4pgs, http://www.dowcorning.com/content/publishdlit/DC%28R%295562CarbinolFluid.pdf.
"Carbinol (Hydroxyl) Terminated Polydimethylsiloxane, 110-140 cSt", Gelest, Inc. (1999-2012), 2 pages, http://shop.gelest.com/Product.aspx?catnum=DMS-C21&Index=0&TotalCount=1.
"Carbinol (Hydroxyl) Terminated Polydimethylsiloxane, 30-50 cSt", Gelest, Inc. (1999-2012), 2 pages, http://shop.gelest.com/Product.aspx?catnum=DMS-C15&Index=0&TotalCount=3.
Howard, C., et al., "Novel Silicone-Modified Polyurethane Dispersion Technology for Advanced Coating Systems", Abstract, EBSCO Host Connection, 2015 , 2 pages.
Zhang, F.A, et al., "Application of a silicone-modified acrylic emulsion in two-component waterborne polyurethane coatings", J. Coat. Technol.Res. 4 (3), 2007, pp. 289-294.
"Two-Component Solventborne Polyurethane Coatings" Bayer MaterialScience, 2 pages https://bayermaterialsciencenafta.com/processing/cas/2k-solventborne/index.html.
International Search Report and Written Opinion for International Application No. PCT/US2015/027954 dated Oct. 28, 2015, 12 pages.
The Extended European Search Report for International Application No. PCT/US2015/027954 dated Nov. 14, 2017, 5 pages.

* cited by examiner

COATING SYSTEM

BACKGROUND

Electrostatic printing processes typically involve creating an image on a photoconductive surface, applying an ink having charged particles to the photoconductive surface, such that they selectively bind to the image, and then transferring the charged particles in the form of the image to a print substrate.

The photoconductive surface is typically on a cylinder and is often termed a photo imaging plate (PIP). The photoconductive surface is selectively charged with a latent electrostatic image having image and background areas with different potentials. For example, an electrostatic ink composition comprising charged toner particles in a carrier liquid can be brought into contact with the selectively charged photoconductive surface. The charged toner particles adhere to the image areas of the latent image while the background areas remain clean. The image is then transferred to a print substrate (e.g. paper) directly or, more commonly, by being first transferred to an intermediate transfer member.

During electrostatic printing of an image, ink may contact and/or be splashed on various components of the printer. In some instances, ink may accumulate on or in printer components.

DETAILED DESCRIPTION

Figure 1:
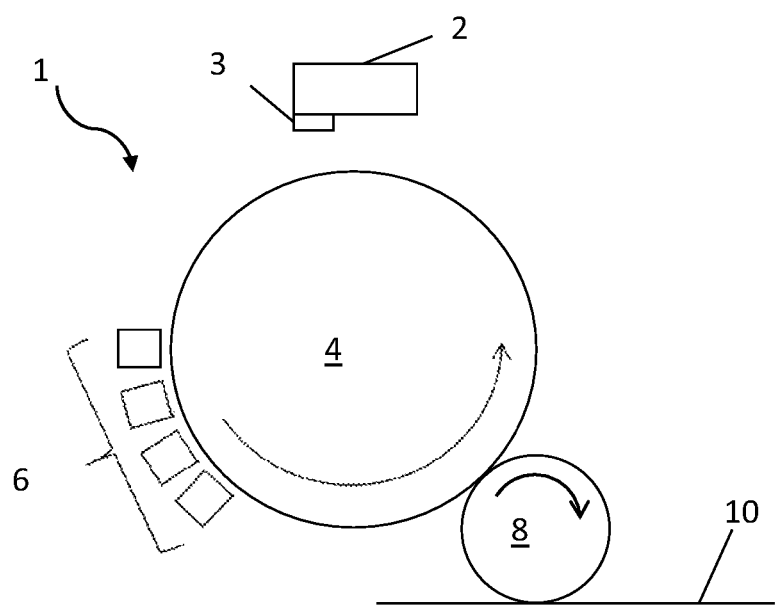
FIG. 1 is a schematic illustration of a Liquid Electro Photographic (LEP) printer.

Before the coating systems and related aspects are disclosed and described, it is to be understood that this disclosure is not limited to the particular process features and materials disclosed herein because such process features and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is noted that, as used in this specification and the appended claims, the singular forms "a", "an", and "the" include plural references unless the context clearly dictates otherwise.

As used herein, "electrostatic ink" generally refers to an ink composition that is typically suitable for use in an electrostatic printing process, sometimes termed an electrophotographic printing process. The electrostatic ink may include chargeable particles of resin and pigment dispersed in a liquid carrier. In some examples, the electrostatic ink may be a liquid electrostatic ink such as ElectroInk® or any other Liquid Electro Photographic (LEP) inks developed by Hewlett-Packard Company.

As used herein, "electrostatic printing" or "electrophotographic printing" generally refers to the process that provides an image that is transferred from a photo imaging substrate either directly, or indirectly via an intermediate transfer member, to a print substrate. As such, the image is not substantially absorbed into the photo imaging substrate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid ink is employed in the electrophotographic process rather than a powder toner. An electrostatic printing process may involve subjecting the electrostatic ink composition to an electric field, e.g. an electric field having a field gradient of 1000 V/cm or more, or in some examples 1500 V/cm or more.

If a standard test method is mentioned herein, unless otherwise stated, the version of the test to be referred to is the most recent at the time of filing this patent application.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Sizes, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

Unless otherwise stated, any feature described herein can be combined with any aspect or any other feature described herein.

In an aspect, there is provided a coating system for forming a silicone polyurethane polymer coating. The coating system may be described as a solvent-borne coating system. The coating system may comprise a base component and a hardener component, the base component comprising a polyol composition comprising a hydroxyl terminated polyester and/or a hydroxyl terminated polyether and a hydroxyl terminated polysiloxane, the hardener component comprising a polyisocyanate. In some examples, the base component and the hardener component both comprise a solvent selected form aromatic hydrocarbons, ketones, esters and combinations thereof.

The coating system comprising a base component and a hardener component is referred to herein as a two-component coating system.

In some examples, the coating system comprises separate base and hardener components, for example the base component and the hardener component may be contained in separate receptacles. In some examples, the two-component system comprises a first receptacle comprising the base component and a second receptacle comprising the hardener component.

In some examples, the coating system may be a kit comprising a first receptacle comprising the base component and a second receptacle comprising the hardener component.

In an aspect, there is provided a two-component coating system. The two-component coating system may comprise a base component and a hardener component, the base component comprising:
up to 55 wt. % hydroxyl terminated polyester and/or hydroxyl terminated polyether;
up to 3 wt. % hydroxyl terminated polysiloxane; and
a solvent selected from aromatic hydrocarbons, ketones, esters and combinations thereof, wherein the hydroxyl terminated polyester and/or hydroxyl terminated polyether and the hydroxyl terminated polysiloxane are dissolved in the solvent,
the hardener component comprising:
up to 80 wt. % polyisocyanate; and
a solvent selected from aromatic hydrocarbons, ketones, esters and combinations thereof, wherein the polyisocyanate is dissolved in the solvent.

In some examples, the base component comprises up to 55 wt. % hydroxyl terminated polyester. In some examples, the base component comprises 45 to 55 wt. % hydroxyl terminated polyester.

In some examples, the base component comprises 45 to 55 wt. % hydroxyl terminated polyester and/or hydroxyl terminated polyether.

Any hydroxyl terminated polyester, hydroxyl terminated polyether or hydroxyl terminated polysiloxane that may be present in the base component may dissolved in the solvent of the base component.

In some examples, the hydroxyl terminated polyester and/or hydroxyl terminated polyether has a hydroxyl content of greater than about 1 wt. % by total weight of hydroxyl terminated polyester/polyether. In some examples, the hydroxyl terminated polyester and/or hydroxyl terminated polyether has a hydroxyl content of greater than about 3 wt. % by total weight of hydroxyl terminated polyester/polyether. In some examples, the hydroxyl terminated polyester/polyether has a hydroxyl content of greater than about 5 wt. % by total weight of hydroxyl terminated polyester/polyether. In some examples, the hydroxyl terminated polyester and/or hydroxyl terminated polyether has a hydroxyl content of greater than about 7 wt. % by total weight of hydroxyl terminated polyester/polyether. In some examples, the hydroxyl terminated polyester/polyether has a hydroxyl content of greater than about 9 wt. % by total weight of hydroxyl terminated polyester/polyether.

In some examples, the hydroxyl terminated polyester and/or hydroxyl terminated polyether has a hydroxyl content of up to about 10 wt. % by total weight of hydroxyl terminated polyester/polyether.

In some examples, the hydroxyl terminated polyester and/or hydroxyl terminated polyether has a hydroxyl content of from about 1 wt. % to about 10 wt. % by total weight of hydroxyl terminated polyester and/or hydroxyl terminated polyether. In some examples, the hydroxyl terminated polyester and/or hydroxyl terminated polyether has a hydroxyl content of from about 5 wt. % to about 10 wt. % by total weight of hydroxyl terminated polyester/polyether. In some examples, the hydroxyl terminated polyester and/or hydroxyl terminated polyether has a hydroxyl content of from about 7 wt. % to about 10 wt. % by total weight of hydroxyl terminated polyester/polyether. In some examples, the hydroxyl terminated polyester and/or hydroxyl terminated polyether has a hydroxyl content of from about 9 wt. % to about 10 wt. % by total weight of hydroxyl terminated polyester/polyether.

In some examples, the hydroxyl terminated polyester comprises a branched hydroxyl terminated polyester. In some examples the hydroxyl terminated polyester comprises a mixture of different branched hydroxyl terminated polyesters.

In some examples, the hydroxyl terminated polyether comprises a branched hydroxyl terminated polyether. In some examples the hydroxyl terminated polyether comprises a mixture of different branched hydroxyl terminated polyethers.

In some examples, the base component comprises a hydroxyl terminated polyester and a hydroxyl terminated polyether, the base component comprising up to 55 wt. % in total of hydroxyl terminated polyester and a hydroxyl terminated polyether.

In some examples, the base component comprises a linear hydroxyl terminated polysiloxane. A linear hydroxyl terminated polysiloxane comprises two hydroxyl groups per molecule.

In some examples, the hydroxyl terminated polysiloxane is a carbinol terminated polysiloxane.

In some examples, the hydroxyl terminated polysiloxane is a hydroxyl terminated polydimethylsiloxane (polydimethylsiloxane is also known as dimethicone) such as Dow Corning® 5562 carbinol fluid (bis-hydroxyethoxypropyl dimethicone, viscosity 50 cSt @ 25° C.) available from Dow Corning, DMS-C21 (bis-hydroxyethoxypropyl polydimethylsiloxane, viscosity 110-140 cSt) available from Gelest, DMS-C15 (bis-hydroxyethoxypropyl polydimethylsiloxane, viscosity 30-50 cSt) available from Gelest, or Baysilone OF-OH702 E available from Momentive.

In some examples, the hydroxyl terminated polysiloxane may have the formula (I):

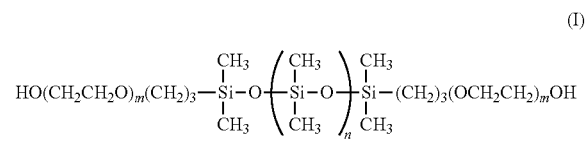

(I)

wherein m is 1; and
n is an integer.

In some examples, n may be 5 or greater, in some examples 10 or greater, in some examples greater than 50, in some examples greater than 70.

In some examples the hydroxyl terminated polysiloxane is a bis-hydroxyethoxypropyl polydimethylsiloxane.

In some examples, the hydroxyl terminated polysiloxane has a molecular weight of between 500 and 15000 Daltons. In some examples, the hydroxyl terminated polysiloxane has a molecular weight of between 500 and 10000 Daltons. In some examples, the hydroxyl terminated polysiloxane has a molecular weight of between 600 and 10000 Daltons.

In some examples, the hydroxyl terminated polysiloxane has a viscosity of between about 10 and about 1000 cSt, in some examples between about 20 and about 500 cSt.

Viscosities described herein may be measured at 23° C. unless stated otherwise. Viscosities described herein may be measured according to ASTM D 445-46T.

In some examples, the base component comprises up to about 3 wt. % hydroxyl terminated polysiloxane. In some examples, the base component comprises up to about 2.5 wt. % hydroxyl terminated polysiloxane. In some examples, the base component comprises up to about 2 wt. % hydroxyl terminated polysiloxane.

In some examples, the base component comprises at least about 0.05 wt. % hydroxyl terminated polysiloxane. In some examples, the base component comprises at least about 0.1 wt. % hydroxyl terminated polysiloxane. In some examples, the base component comprises at least about 0.2 wt. % hydroxyl terminated polysiloxane.

In some examples, the base component comprises 0.1 to 3 wt. % hydroxyl terminated polysiloxane. In some examples, the base component comprises 0.1 to 2.5 wt. % hydroxyl terminated polysiloxane. In some examples, the base component comprises 0.2 to 2 wt. % hydroxyl terminated polysiloxane.

In some examples, the base component further comprises a catalyst. In some examples the catalyst is an organometallic catalyst. In some examples, the organometallic catalyst is a tin-containing catalyst. In some examples, a tin-containing catalyst may be dibutyltin dilaurate.

In some examples, the catalyst is a catalyst which promotes the reaction of the isocyanate of the hardener component with the hydroxyl groups of the base component over then reaction of isocyanate with any water that may be present.

In some examples, the catalyst is a heat cure catalyst.

In some examples, the base component comprises up to about 2 wt. % of a catalyst. In some examples, the base component comprises up to about 1 wt. % of a catalyst.

In some examples, the base component comprises at least about 0.1 wt. % of a catalyst. In some examples, the base component comprises at least about 0.5 wt. % of a catalyst.

In some examples, the base component comprises from about 0.5 wt. % up to about 1 wt. % of a catalyst.

In some examples, the base component comprises at least about 40 wt. % solvent. In some examples, the base component comprises at least about 45 wt. % solvent. In some examples, the base component comprises at least about 50 wt. % solvent.

In some examples, the base component comprises up to about 55 wt. % solvent.

In some examples, the solvent of the base component is selected from ethyl acetate, glycol acetate, methyl ethyl ketone, isopropyl acetate, butyl acetate and toluene or combinations thereof. In some examples, the solvent of the base component is selected from ethyl acetate, glycol acetate and methyl ethyl ketone or combinations thereof. In some examples, the solvent of the base component is selected from isopropyl acetate, butyl acetate and toluene or combinations thereof.

In some examples, the solvent of the base component comprises: from about 18 wt. % to about 23 wt. % ethyl acetate; from about 22 wt. % to about 27 wt. % glycol acetate; and from about 2 wt. % to about 4 wt. % methyl ethyl ketone.

In some examples, the solvent of the base component is a polyurethane grade solvent. A polyurethane grade solvent may be defined as a solvent having a water content of 0.05 wt. % or less.

In some examples, the base component further comprises a moisture scavenger. In some examples, the base component comprises up to 5 wt. % of a moisture scavenger. In some examples, the base component comprises from about 0.5 wt. % to about 3 wt. % of a moisture scavenger. In some examples, the moisture scavenger is a hydrolyzable ester, such as triethyl orthoformate.

A polyisocyanate is a molecule comprising at least two isocyanate functional groups.

In some examples, the hardener component comprises an aliphatic polyisocyanate. In some examples the aliphatic polyisocyanate may be a $C_2$-$C_{12}$ aliphatic polyisocyanate, in some examples $C_2$-$C_8$.

In some examples, the aliphatic polyisocyanate comprises at least 2 isocyanate groups per molecule. In some examples, the aliphatic polyisocyanate comprises 2 or 3 isocyanate groups per molecule.

In some examples, the aliphatic polyisocyanate is a diisocyanate or is derived from a diisocyanate. In some examples "an aliphatic polyisocyanate derived from a diisocyanate" means a pre-polymer formed from diisocyanate monomers, for example a pre-polymer comprising a diisocyanate functionality. In some examples, the aliphatic polyisocyanate is hexamethylene diisocyanate or is based on hexamethylene diisocyanate, for example a pre-polymer comprising a hexamethylene diisocyanate functionality. In some examples, the aliphatic polyisocyanate is a HDI-biuret polyisocyanate, i.e. a polyisocyanate having 3 isocyanate groups per molecule, or is based on HDI-biuret polyisocyanate, e.g. a pre-polymer comprising a HDI-biuret polyisocyanate functionality.

The term 'pre-polymer' as used herein may be used to describe a polyisocyanate of the hardener component.

In some examples, the hardener component comprises from about 74 wt. % to about 80 wt. % polyisocyanate.

In some examples, the hardener component further comprises a moisture scavenger. In some examples, the hardener component comprises up to 5 wt. % of a moisture scavenger. In some examples, the hardener component comprises from about 0.5 wt. % to about 3 wt. % of a moisture scavenger. In some examples, the moisture scavenger is a hydrolyzable ester, such as triethyl orthoformate.

In some examples, either the base component or the hardener component comprise a moisture scavenger. In some examples, the base component and the hardener component comprise a moisture scavenger.

In some examples, the hardener component comprises at least about 5 wt. % solvent. In some examples, the hardener component comprises at least about 10 wt. % solvent. In some examples, the hardener component comprises at least about 15 wt. % solvent. In some examples, the hardener component comprises at least about 18 wt. % solvent. In some examples, the hardener component comprises at least about 20 wt. % solvent.

In some examples, the hardener component comprises up to about 25 wt. % solvent.

In some examples, the solvent of the hardener component is selected from ethyl acetate, glycol acetate, or combinations thereof.

In some examples, the solvent of the hardener component comprises: from about 5 wt. % to about 7 wt. % ethyl acetate; and from about 13 wt. % to about 18 wt. % glycol acetate.

In some examples, the solvent of the hardener component is a polyurethane grade solvent. A polyurethane grade solvent may be defined as a solvent having a water content of 0.05 wt. % or less.

In some examples, the solvent of the hardener component is the same as the solvent of the base component.

In some examples, the base component and/or the hardener component comprises less than 5 wt. % water, in some examples less than 3 wt. % water, in some examples less than 1 wt. % water, in some examples less than 0.5 wt. % water, in some examples, less than 0.1 wt. % water, and in some examples less than 0.05 wt. % water.

In an aspect, there is provided a silicone polyurethane polymer coating which is the cured product of the two-component system having a base component and a hardener component described above.

In an aspect, there is provided a substrate on which a silicone polyurethane polymer coating is disposed. The silicone polyurethane polymer coating may comprise the cured product of a two-component system having a base component and a hardener component as described above.

In some examples, the coating is the cured product of the base component and the hardener component of the two-component system described above combined such that the ratio of the number of isocyanate functional groups of the hardener component to the total number of hydroxyl groups of the base component (also known as the NCO/OH index) is at least about 0.8, in some examples at least about 0.88, in some examples at least about 0.9.

In some examples, the coating is the cured product of the base component and the hardener component of the two-component system described above combined such that the ratio of the number of isocyanate functional groups of the hardener component to the total number of hydroxyl groups of the base component (also known as the NCO/OH index) is in the range of 0.8 to 1.5. In some examples, the NCO/OH index is in the range of 0.8 to 1.3, in some examples the NCO/OH index is in the range of 0.8 to 1.2, in some examples the NCO/OH index is in the range of 0.88 to 1.2, in some examples the NCO/OH index is in the range of 0.9 to 1.1, in some examples the NCO/OH index is in the range of 0.9 to 1.0.

In some examples, the substrate on which a silicone polyurethane polymer coating is disposed is a printer component. In some examples, the printer component is a component of a LEP printer. In some examples, the component of a LEP printer is a component of a binary ink developer (BID) unit, such as a BID unit tray.

In some examples, there is provided an LEP printer comprising a component having a coating formed from the coating system described herein.

In some examples, the substrate is a plastic substrate, such as a polycarbonate or a glass filled polycarbonate. In some examples, the substrate is a metal substrate, such as a nickel substrate.

In an aspect, there is provided a method of coating a substrate. The method may comprise contacting the base component and the hardener component of the two-component coating system described above on a substrate.

In some examples, the base component and the hardener component are contacted in amount such that the NCO/OH index is at least about 0.8, in some examples at least about 0.88, in some examples at least about 0.9.

In some examples, the base component and the hardener component are contacted in amount such that the NCO/OH index is in the range of 0.8 to 1.5. In some examples, the NCO/OH index is in the range of 0.8 to 1.3, in some examples 0.8 to 1.2, in some examples 0.88 to 1.2, in some examples 0.9 to 1.1, in some examples the NCO/OH index is in the range of 0.9 to 1.0.

In some examples, the base and hardener components of the two-component coating system are mixed before being applied to a substrate.

In some examples, the base and hardener components of the two-component coating system are mixed on a surface of a substrate to form a coating on the substrate.

In some examples, the method further comprises curing the coating comprising the base and hardener components to form a silicone polyurethane polymer coating.

In some examples, the coating may be cured chemically as the base and hardener components are contacted. In some examples, the coating composition comprising the base and hardener components may be cured at room temperature, i.e. at a temperature of about 25° C. In some examples, the coating composition may be cured at room temperature for at least 7 days, in some examples for about 10 days. In some examples, the coating comprising the base and hardener components may be cured by heating. In some examples, the coating may be heated to greater than about 50° C. in order to cure the coating, in some examples greater than about 70° C., in some examples greater than about 80° C. In some examples, the coating comprising the base component and the hardener component may be heated to between 80° C. and 150° C., in some examples to between 80° C. and 125° C. to cure the coating comprising the base component and the hardener component to form a silicone polyurethane polymer coating. In some examples, the coating comprising the base component and the hardener component may be heated for at least 1 hour, in some examples at least 2 hours, in some examples at least 3 hours, in some examples at least 4 hours. In some examples, the coating comprising the base and hardener components may be heated for up to 4 hours.

LEP Printers and Components

FIG. 1 shows a schematic illustration of a Liquid Electro Photographic (LEP) printer 1. An image, including any combination of graphics, text and images, is communicated to the LEP printing apparatus 1. The LEP includes a photo charging unit 2 and a photo-imaging cylinder 4. The image is initially formed on a photoconductive member in the form of a photo-imaging cylinder 4 before being transferred to a print substrate 10, in this example via an intermediate transfer member (ITM) 8.

According to an illustrative example, the initial image is formed on a rotating photo-imaging cylinder 4 by the photo charging unit 2. Firstly, the photo charging unit 2 deposits a uniform static charge on the photo-imaging cylinder 4 and then a laser imaging portion 3 of the photo charging unit 2 dissipates the static charges in selected portions of the image area on the photo-imaging cylinder 4 to leave a latent electrostatic image on the surface of the photo-imaging cylinder 4. The latent electrostatic image is an electrostatic charge pattern representing the image to be printed. Ink (for example, a liquid electrostatic ink such as ElectroInk® or any other Liquid Electro Photographic (LEP) inks developed by Hewlett-Packard Company) may then transferred to the photo-imaging cylinder 4 by Binary Ink Developer (BID) units 6. The BID units 6 present a uniform film of ink to the photo-imaging cylinder 4. The ink contains electrically charged pigment particles which are attracted to the latent electrostatic image on the photo-imaging cylinder 4. The ink is repelled from the uncharged, non-image areas and forms a developed toner image on the surface of the latent electrostatic image. The developed toner image is then transferred to a print substrate 10.

The inventors have found that during transfer of electrostatic ink from the BID units 6 to the photo-imagine cylinder 4, and the from the photo-imaging cylinder 4 to the ITM 8, and then from the ITM 8 to the print substrate 10, that ink may accumulate on printer components, such as a tray of the BID unit, a housing in which an LEP printer 1 is encased, or any other components of the LEP printer.

Figure 2:
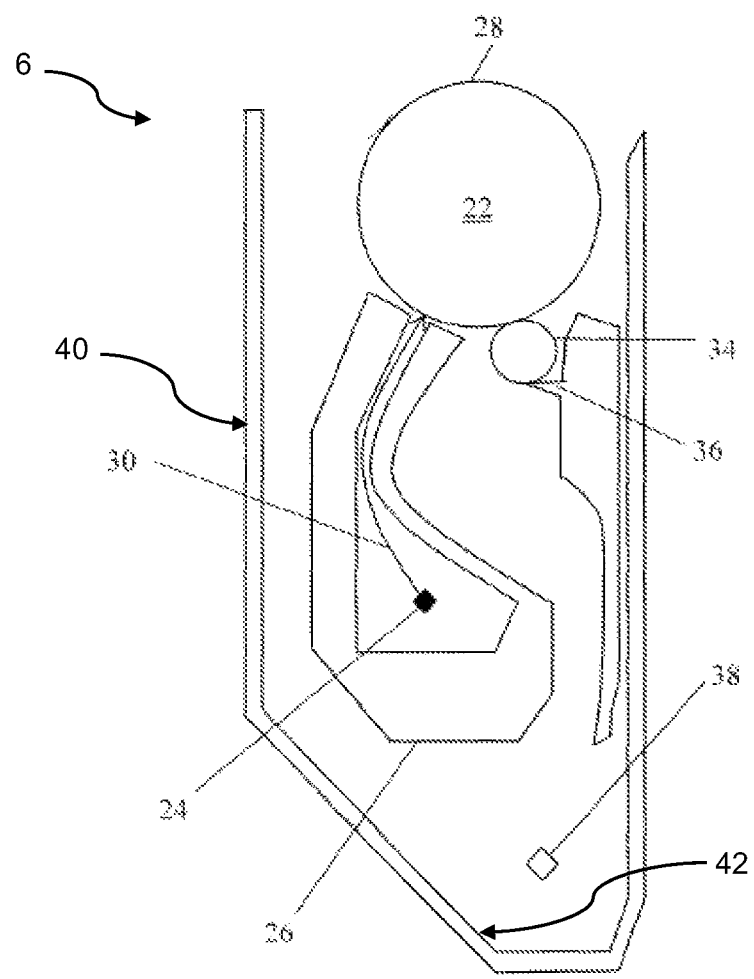
FIG. 2 is a schematic illustration of a binary ink developer (BID) unit comprising an example of a BID tray on which a silicone polyurethane polymer coating may be disposed.

For example, FIG. 2 shows a schematic illustration of a BID unit 6 from which electrostatic ink may be supplied to the photo-imaging cylinder 4 of a LEP printer 1. A BID unit 6 may comprise an ink transfer apparatus comprising an ink inlet 24 and an electrode 26 for transferring ink from an ink supply apparatus (not shown) to a developer roller 22. The developer roller 22 may be arranged to transfer ink to a photo-imaging cylinder 4 of the LEP printer shown in FIG. 1. Electrostatic ink enters the BID unit through ink inlet 24 and a potential difference created between the ink supply electrode 26 and the surface 28 of the developer roller 22 causes charged electrostatic ink to be electrostatically transferred from the ink inlet 24 to the developer roller surface 28 in the direction indicated by arrow 30.

According to this illustrative example, the BID unit 6 comprises a squeezer roller 34 and a scraper 36 which may be used to clean the developer roller surface 28 by removing ink. Such removed ink may flow towards an ink outlet 38 for collection and re-use or discarding. The BID unit 6 may comprise a housing 40 formed of a tray, e.g. a plastic, such as glass filed polycarbonate, tray. The present inventors have found that providing a coating 42 formed from the above-described two-component coating system reduces or prevents ink accumulation in or on the tray. Ink accumulation within the BID unit has been found to cause ink leakage from the BID unit.

EXAMPLES

It is to be understood that the following examples are illustrative of the application of the principles of the coating systems and related aspects. Numerous modifications and alternative coating systems may be devised by those skilled in the art without departing from the spirit and scope of the present coating systems and related aspects. The appended claims are intended to cover such modifications and arrangements. Thus, while the present coating systems and related aspects have been described above with particularity, the following examples provide further detail in connection with what are presently deemed to be acceptable.

Example 1

A two-component coating system comprising a base component as described in table 1 below and a hardener component as described in table 2 below was provided. The base component materials were mixed in the quantities shown in table 1 to form the base component. The hardener component materials were mixed in the quantities shown in table 2 to form the hardener component.

TABLE 1

| Base component materials | Wt. % in base component | Supplier |
| --- | --- | --- |
| Desmophen ® 670 BA (hydroxyl-bearing polyester, viscosity 3000 mPa · s @ 23° C.) | 9 | Bayer Material Science |
| Desmophen ® 651 MPA (hydroxyl-bearing polyester, viscosity 14500 mPa · s @ 23° C.) | 46 | Bayer Material Science |
| Dow Corning ® 5562 Carbinol fluid (bis-hydroxyethoxypropyl dimethicone, viscosity 50 cSt @ 25° C.) | 1 | Dow Corning |
| Ethyl acetate | 19 | |
| Glycol acetate | 22 | |
| Methyl ethyl ketone | 2 | |
| Dibutyltin dilaurate | 1 | |

TABLE 2

| Hardener component materials | Wt. % in base component | Supplier |
| --- | --- | --- |
| Desmodur ® N 3200 (solvent free aliphatic polyisocyanate resin based on hexamethylene diisocyanate (HDI), viscosity 2500 mPa · s @ 23° C.) | 74 | Bayer Material Science |
| Ethyl acetate | 8 | |
| Glycol acetate | 17 | |
| Triethyl orthoformate | 1 | |

The base component and the hardener component were then mixed in a 2:1 ratio to form a two-component coating composition comprising the base component and the hardener component. The NCO/OH index of the resulting two-component coating composition was calculated to be 0.9.

Example 2

A glass filled polycarbonate substrate was dip-coated with the two-component coating composition formed in Example 1 above. The dip-coated substrate was then cured for 4 hours at 125° C. to form a glass filled polycarbonate substrate having a silicone polyurethane polymer coating disposed on its surface.

Example 3

A nickel substrate was dip-coated with the two-component coating composition formed in Example 1 above. The dip-coated substrate was then cured for 4 hours at 125° C. to form a nickel substrate having a silicone polyurethane polymer coating disposed on its surface.

Reference Example 4

A glass filled polycarbonate substrate was coated with a reference fluorinated polyurethane coating.

Example 5

Figure 3:
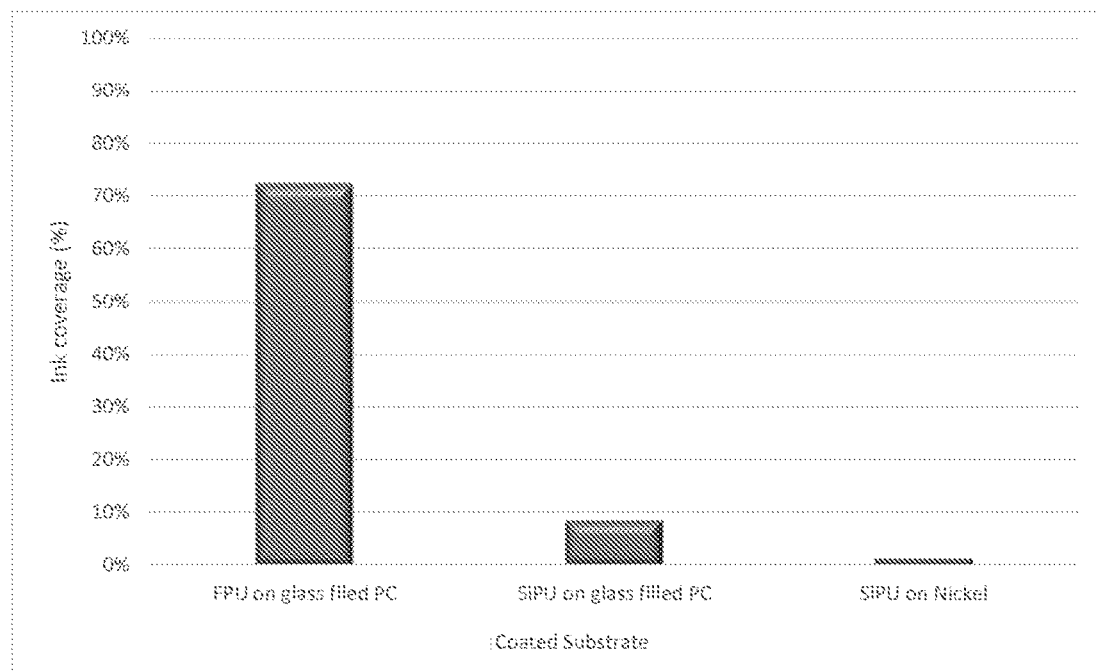
FIG. 3 is a graph showing the ink coverage on different substrates having different polymer coatings.

Magenta ElectroInk® 4.5 (Hewlett-Packard Company) was deposited on each of the coated substrates of examples 2 and 3 and comparative example 4. Each of the coated substrates was positioned at a 30 degree angle relative to horizontal and the electrostatic ink was flowed over the coated substrates at a flow rate in the range of 0.2 gpm to 1 gpm for 1.5 mins (wet cycle). Each of the coated substrates was then dried at room temperature for 15 mins (dry cycle). The wet and dry cycles were then repeated six times each to give a total of 7 wet cycles and 7 dry cycles. The ink coverage on the coated substrates was determined using computerized visual analysis. The results of the computerized visual analysis are shown in FIG. 3 which show the amount of ink that accumulated on each of the coated substrates. FIG. 3 shows that the silicone polyurethane polymer coating described above is much more effective at preventing the accumulation of ink on surfaces than the reference fluorinated polyurethane polymer coating.

The inventors also mixed the hardener component and base component of Example 1 such that the NCO/OH index of the resulting two-component coating composition was 1.3. This two-component coating composition was tested in the same way as the two component coating composition formed in Example 1, as described in Example 5, and was found to perform equally well.

The two component coating composition formed in Example 1 was also tested using different polysiloxanes in the base component in place of the polysiloxane used in Example 1. A coating composition in which the base component contained DMS-C21 (bis-hydroxyethoxypropyl polydimethylsiloxane, viscosity 110-140 cSt) available from Gelest as the polysiloxane and a coating composition in which the base component contained DMS-C15 (bis-hydroxyethoxypropyl polydimethylsiloxane, viscosity 30-50 cSt) available from Gelest as the polysiloxane were formed in the way described in Example 1 and tested according to Example 5, both of these coating compositions were found to found to perform equally as well as the coating composition of Example 1.

While the coating systems, substrates and related aspects have been described with reference to certain examples, those skilled in the art will appreciate that various modifications, changes, omissions, and substitutions can be made without departing from the spirit of the disclosure. It is intended, therefore, that the coating systems, substrates and related aspects be limited only by the scope of the following claims. Unless otherwise stated, the features of any dependent claim can be combined with the features of any of the other dependent claims, and any other independent claim.

The invention claimed is:

1. A two-component coating system comprising a base component and a hardener component, the base component comprising:
   up to 55 wt. % hydroxyl terminated polyester and/or hydroxyl terminated polyether;
   up to 3 wt. % hydroxyl terminated polysiloxane;
   a moisture scavenger; and
   a solvent selected from aromatic hydrocarbons, ketones, esters and combinations thereof, wherein the hydroxyl terminated polyester and/or hydroxyl terminated polyether and the hydroxyl terminated polysiloxane are dissolved in the solvent,
the hardener component comprising:
   up to 80 wt. % polyisocyanate; and
   a solvent selected from aromatic hydrocarbons, ketones, esters and combinations thereof, wherein the polyisocyanate is dissolved in the solvent; wherein the solvent of the base component comprises about 18 wt % to about 23 wt % ethyl acetate, about 22 wt % to about 27 wt % glycol acetate, and about 2 wt % to about 4 wt % methyl ethyl ketone; or the solvent of the hardener component comprises about 5 wt % to about 7 wt % ethyl acetate and about 13 wt % to about 18 wt % glycol acetate.

2. The two-component coating system according to claim 1, wherein the hydroxyl terminated polysiloxane is a linear hydroxyl terminated polysiloxane.

3. The two-component coating system according to claim 1, wherein the base component comprises 0.2 wt. % to 2 wt. % hydroxyl terminated polysiloxane.

4. The two-component coating system according to claim 1, wherein the base component further comprises an organometallic catalyst.

5. The two-component coating system according to claim 4, wherein the organometallic catalyst is a tin-containing catalyst.

6. The two-component coating system according to claim 1, wherein the base component comprises up to 55 wt. % hydroxyl terminated polyester.

7. The two-component coating system according to claim 1, wherein the solvent of the base component and the solvent of the hardener component are polyurethane grade solvents.

8. The two-component coating system according to claim 1, wherein the hardener component further comprises a moisture scavenger.

9. The two-component coating system according to claim 1, wherein the polyisocyanate is an aliphatic polyisocyanate.

10. The two-component coating system according to claim 9, wherein the polyisocyanate is derived from hexamethylene diisocyanate.

11. The two-component coating system according to claim 1, wherein the hardener component comprises 74 wt. % to 80 wt. % polyisocyanate.

12. The two-component coating system according to claim 1, wherein the hydroxyl terminated polyisocyanate is a bis-hydroxyethoxypropyl polydimethylsiloxane.

13. A substrate on which a silicone polyurethane polymer coating is disposed, the silicone polyurethane polymer coating comprising the cured product of the two-component coating system of claim 1.

14. The substrate according to claim 13, wherein the cured product is the cured product of the base component and the hardener component of claim 1 combined such that the ratio of the number of isocyanate functional groups of the hardener component to the total number of hydroxyl groups of the base component is in the range of 0.8 to 1.5.

15. The substrate according to claim 13, wherein the substrate is a printer component.

16. The substrate according to claim 13, wherein the cured product is the cured product of the base component and the hardener component of claim 1 combined such that the ratio of the number of isocyanate functional groups of the hardener component to the total number of hydroxyl groups of the base component is in the range of 0.8 to 0.9.

17. A method of coating a substrate, the method comprising:
   contacting the base component and the hardener component of the two-component coating system of claim 1 on a substrate.

18. The method according to claim 17, wherein the base component and the hardener component are contacted such that the ratio of the number of isocyanate functional groups of the hardener component to the total number of hydroxyl groups of the base component is in the range of 0.8 to 1.5.

19. The method according to claim 17, wherein the base and hardener components of the two-component coating system are mixed on a surface of the substrate.

* * * * *

UNITED STATES PATENT AND TRADEMARK OFFICE
CERTIFICATE OF CORRECTION

PATENT NO. : 10,294,363 B2  
APPLICATION NO. : 15/547461  
DATED : May 21, 2019  
INVENTOR(S) : Minedys Macias Guzman Page 1 of 1

It is certified that error appears in the above-identified patent and that said Letters Patent is hereby corrected as shown below:

In the Drawings

Drawing sheet 3 of 3, FIG. 3, Line 1 (x-axis), delete "filed" and insert -- filled --, therefor.

Signed and Sealed this  
Seventeenth Day of September, 2019

Andrei Iancu  
*Director of the United States Patent and Trademark Office*